(12) United States Patent
Pinegger

(10) Patent No.: US 12,220,857 B2
(45) Date of Patent: *Feb. 11, 2025

(54) BASE STRUCTURE, DEVICE AND METHOD FOR TRANSPORTING FILMS

(71) Applicant: GloBra GmbH, Salzburg (AT)

(72) Inventor: Wolfgang Pinegger, Schladming-Rohrmoos (AT)

(73) Assignee: GloBra GmbH, Salzburg (AT)

( * ) Notice: Subject to any disclaimer, the term of this patent is extended or adjusted under 35 U.S.C. 154(b) by 832 days.

This patent is subject to a terminal disclaimer.

(21) Appl. No.: 17/351,456

(22) Filed: Jun. 18, 2021

(65) Prior Publication Data

US 2021/0308933 A1    Oct. 7, 2021

Related U.S. Application Data

(63) Continuation of application No. PCT/EP2019/050188, filed on Jan. 5, 2019.

(30) Foreign Application Priority Data

Dec. 18, 2018    (DE) .................... 10 2018 132 763.3

(51) Int. Cl.
*B29C 55/08*    (2006.01)
*B29K 67/00*    (2006.01)
*B29L 7/00*    (2006.01)

(52) U.S. Cl.
CPC ........ *B29C 55/08* (2013.01); *B29K 2067/003* (2013.01); *B29L 2007/008* (2013.01)

(58) Field of Classification Search
CPC .............. B29C 55/08; B29K 2067/003; B29L 2007/008; B29D 7/01; B65H 20/06; B65H 20/02; B65H 23/022
See application file for complete search history.

(56) References Cited

U.S. PATENT DOCUMENTS

| 2011/0200702 | A1  |   | 8/2011 | Harada et al. |
| 2018/0056576 | A1  | * | 3/2018 | Qu ........................ B29C 55/16 |
| 2019/0134883 | A1  |   | 5/2019 | Pinegger |

FOREIGN PATENT DOCUMENTS

| DE | 36 21 205 A1 | 1/1988 |
| WO | 2010/0046738 A1 | 4/2010 |
| WO | WO-2017215731 A1 * | 12/2017 ............. B29C 55/08 |

OTHER PUBLICATIONS

International Search Report issued for corresponding International Patent Application No. PCT/EP2019/050188 mailed on Sep. 23, 2019.

* cited by examiner

*Primary Examiner* — Jamel M Nelson
(74) *Attorney, Agent, or Firm* — Myers Wolin, LLC

(57) ABSTRACT

A base structure, device and method are provided for transporting film in a transport direction, in particular, for a stretching plant, where at least one upper moving rope and one lower moving rope are guided and the one upper guided rope and the at least one lower guided rope clamp and entrain the film at its side edge at least in places.

20 Claims, 8 Drawing Sheets

BASE STRUCTURE, DEVICE AND METHOD FOR TRANSPORTING FILMS

CROSS REFERENCE TO RELATED APPLICATIONS

This application is a continuation under 35 U.S.C. § 120 of International Application PCT/EP2019/050188, filed Jan. 5, 2019, which claims priority to German Application No. 10 2018 132 763.3, filed Dec. 18, 2018, the contents of each of which are incorporated by reference herein.

FIELD OF THE INVENTION

The present invention relates to a base structure, a device, and a method for the transport of film. Such base structures, devices, and methods are used for the production of films, in particular, endless films made from plastic material, which can be stretched.

BACKGROUND

Usually, the production of such endless films is carried out by applying melted plastic granulate (the so-called melt) onto a moving cooling body, where it forms a film while being cooled and being taken along by the moving cooling body. The cooled film then is separated from the cooling body. This cooled film also is referred to as the "cast film". Subsequently, the phases of reheating the thus created film and the stretching of the film, namely, e.g., in film transport direction (Machine Direction, MD), transverse with respect to the transport direction (Transverse Direction, TD), and eventually thermo-fixing (Heat Setting), cooling, cutting the edges, further processing and winding of the film, e.g. onto a roll, are carried out.

In the following, with respect to the term of the film or the foil film, the "cast film" is meant, namely, the (endless) film, which is presented after cooling and separation from the cooling body. This endless film already may—however, but does not have to—have been stretched.

The films may be of all types, which may be produced by application of a material from a melt by means of extrusion, e.g., by means of a flat nozzle in one or more layers onto the surface of a rotating chill roll and by the subsequent cooling resulting therefrom. This also concerns films, which may be cooled at the same time on the side facing away from the chill roll by means of air, water or by means of further rolls, or in other ways. However, this does not exclusively concern all polyolefin plastic materials, as polypropylene (PP) and polyethylene (PE), polyester (e.g., PET), polyamide, polyactide (PLA), polystyrene, polycarbonates, and all other materials not falling under the definition mentioned above.

In the following, the terms "elongating," "stretching," "drawing," and terms deduced therefrom are used synonymously.

FIGS. 1A and 1B show a typical plant (or a plant part) for heating polypropylene film to be stretched (area I) for the subsequent TD stretching (area II) as well as annealing (area III) and cooling (area IV), with FIG. 1A showing the plant in side view, and FIG. 1B showing the plant in top view. The subdivision into four areas also is applicable for the film transport device according to the invention. In the following, the areas I and II are looked at more closely.

In the known film transport devices, the film is gripped at the inlet 11 of the plant laterally by means of clips in a chain track system, and is transported through the heating zone (area I). In the stretching zone (area II), the clips at either sides change their direction and run outwards, whereby the film is stretched transversely with respect to the transport direction. In the annealing and in the cooling zone, the system may also change its direction or may only be used for the transport of the film. At the outlet 19 of the plant, the film is released again.

This plant has an integrated heater with hot air. The transition between the heating zone (area I) and the stretching zone (area II) is shown in FIG. 2 for the right hand side (seen in MD) of the chain track system.

The chain track system having clips, which slide (sliding chain), and those, which may be advanced by means of roller bearings (roller chain) are distinguished. Sliding chains operate with sliding members, which guide the clips on the rail. The sliding members have to be made from plastic material, and have to be lubricated, which is expensive and causes contaminations. These systems cannot be used for certain films, as PET films.

Roller chains operate with 7-9 roller bearings, namely, rolls with ball bearings per clip. They basically operate with much less lubricants, are expensive, and due to the high number of bearings (many thousands), mechanical problems are easily caused; if only one of these bearings breaks, then the entire system is destroyed or at least disabled.

In the pre-heating zone (area I), the annealing zone (area III), and the cooling zone (area IV), there are no or only very little lateral forces. The very thin and very lightweight film is supported on both sides only.

In the stretching zone (area II), also, lateral forces result from the transverse stretching of the film. However, there, the film is very hot, and will become thinner during passing through the stretching zone. The necessary lateral forces for the stretching of the film and the forces and the energy of the massive chain track systems stand in no reasonable relation to each other.

In prior art, due to the lack of other solutions, for chain track systems having clips, a massive technology is used for the processing in relation to very low forces.

Thus, for 1 meter chain length, approximately 8 clips are employed on average on each side, and the same amount on the return line. The film width for an 8.7 meter plant is 1.2 meter at the TDO inlet. The film thickness, here, amounts to about 140 μm for a film thickness of 20 μm at the end of the stretching zone.

The film, which here is clipped at both sides over a length of one meter has an area of 1.2 m$^2$ and only weighs a few hundred grams. This remains the same during the entire stretching phase; it widens, but at the same time, it becomes thinner.

For this, systems are used weighing several tons, which themselves are subject to very high frictional and tensile forces with corresponding heat development, but which have to support only a few hundreds of grams of film during up to 80% of the path, and which are subject to relatively low lateral forces in the stretching zone.

The system has been fine as long as the machines were slow and the pre-heating zone as well as the annealing and cooling zones were relatively short compared to the stretching zone. Now, with respect to faster machines, the stretching zone is relatively short compared to the other zones, and the system is far too complex and prone to error, too heavy, creates enormous tensile forces, friction, heat, etc. and, in fact, only for supporting a few kilograms of film at both sides.

Sliding systems, as explained above, use thousands of sliding elements, which have to be lubricated. For this, only very expensive special oils can be used due to the heat, and in such systems, oil always is disadvantageous, it must not contact the film, because it contaminates the latter or it leads to film fractures.

These lubricating systems are not only expensive, but also are extremely complicated and prone to errors.

Roller systems comprise up to 30,000 roller bearings in one machine. These are a great risk for the case that only one of them gets stuck or breaks. Because they are made from very hard steel, this may lead to total breakdown of the entire system. Therefore, the bearings in roller chains are replaced in cycles of approximately 2 years preemptively, which is extraordinary expensive.

By now, the tensile forces on the chains are that strong due you to its own weight and system (not due to the film) so that the chain is stretched, and the lubricated chain bolts are worn out very quickly. The lubrication of the chain bolts is very time-consuming and, again, prone to errors. Chain bolts which already are lubricated for their lifetime did not prove to be successful. With these, chain problems up to chain fractures arise. The friction energy involved therewith generates heat and requires complex cooling systems of the chains.

In the end, these very expensive and complicated chain track systems are only used for clipping film, and to pass it through a very long furnace very fast during a pre-heating, transverse stretching, annealing, and cooling procedure. The mechanical problems described above also lead to procedural problems. The massive steel clips with their gripping elements are located in the very hot zone of the furnace, and heat up correspondingly. The longer the machine, the longer the preheating zone is. Thus, the clips are located in very hot areas over long distances, and the faster the machine, the faster they return from the outlet to the inlet. To cool the massive steel clips that fast becomes more and more difficult, because they easily store the heat. Therefore, more and more complex systems for clip cooling are used, which are intended for preventing the gripping elements from being too hot, when taking up the new film at the inlet so that they already melt the film partially, thus leading to film tearing.

Moreover, there is a problem with respect to clip hammers for various film thicknesses. Current plants are designed for film end thicknesses of 10 to 80 µm, sometimes for "cavitated films" of up to 200 µm. The clips, however, always close equally, and are set to the thinnest film. Thereby, it could happen that for thick films and very hot clips, the clip hammers entrench into the film very deeply, and this also leads to film tearing at the edges at the beginning of the stretching zone, as described below.

At high speed, a further problem arises at the location, where the clip system passes from the straight transport area I into the stretching area II. Because the chain track and thereby, the course of the clips, changes its direction and diverges so as to stretch the film, besides the beginning transverse stretching, also, an undesired longitudinal stretching is effected, namely, a so-called unscheduled simultaneous stretching, cf. FIG. 2. The latter in a region, in which the film is retained by clips which are partly too hot and neither in a controlled manner, as heat would be necessary for such a simultaneous stretching.

The film in the clip and at the edge rather is too hot, because of the hot clip, in between it rather is too cold, because there, no hot air arrives, only the radiation heat of the clip. The film, up to a certain speed, can bear this; subsequently, it is torn. One has to consider that this unscheduled longitudinal stretching (with a clip distance of 1 cm at an angle of 17 degrees) takes place, in fact, over 3 cm between the two clips. At a speed of 500 m/min, this longitudinal stretching takes place within only approximately 0.0018 s. At 700 m/min, it only takes place within about 0.0012 s. If the opening angle is distributed over several clips, then, this unscheduled longitudinal stretching process is distributed accordingly.

In existing chain track systems, this deflection and return is achieved by moving the chain tracks laterally at the respectively next support point of the chain track system. This is usually 4 meters at the end of each stretching zone.

This lateral displacement of the straight track at its end in TD direction forms a corresponding angle at the beginning of this track to the preceding track.

This angle then forms the stretching angle for the film in this stretching zone. This means that the stretching angle can be adjusted both positively and negatively from zone to zone by lateral displacement of the straight track elements at their ends.

This is shown in FIGS. 1A and 1B with 5 stretching zones, each 4 meters long.

The stretching angle at the beginning of each track element of the chain track system with clips is mapped differently depending on the system used, the stretching forces required and the production speed.

Monorail systems guide the clips on a vertical track, where the clips are attached to the top and bottom of this track by means of sliding elements or roller bearings and run on this track in MD.

Duorail systems have an upper and a lower track and hold and guide the clips via sliding elements or roller bearings in between one track from above and one track from below.

The systems offer different possibilities of how this stretching angle is represented by the track and the clips at the entrance of each stretching zone and at the exit. This may range from a fully or partially fixed system with little flexibility in setting the stretching angle to a very flexible system with very variable adjustment options.

In principle, duorail systems with low adjustment possibilities and a predefined larger radius in the area of stretching angle adjustment are more reliable and allow higher plant speeds. Their disadvantage is the lower flexibility in terms of stretching angle and radius settings, as well as their greater overall height, which determines the distance between the nozzle boxes and the film, with the corresponding higher heat transfer coefficients.

Monorail systems allow a more flexible setting of stretching angles and also smaller radii of the set angles and usually have a somewhat lower overall height and thus better heat transfer values.

Roller chain systems always have a higher overall height than sliding chain systems.

In addition, there is another problem for the wear of the sliding elements or roller bearings used to connect the clips to the rail, as follows:

In the zones of the stretching furnace where the chain tracks run straight ahead, the forces, since there are only slight lateral forces from the film, are distributed evenly over 4 slide shoes in the case of slide systems, on up to 8 rollers in the case of roller systems. In the stretching zone, the stretching forces from the film are added, which shift backwards in relation to the clips according to the stretching angle. In addition, there are also the stretching forces that arise towards the clip behind from the described unwanted longitudinal stretching of the film between the two clips, when one clip is given a larger stretching angle by the deflection than the clip behind it in the direction of movement.

All these forces cause the clip to try to tilt to the left via the film when deflected to the right, which it is prevented from doing by the track and the sliding or roller elements. At the moment of deflection, however, the large forces caused by this effect of unwanted longitudinal stretching are shifted to only 50% of the sliding or roller elements, which is the main reason for their wear. This is shown in FIG. 2.

Summarized once again, the following can be stated.

As long as the system runs straight in MD, the sliding elements and roller bearings are stressed according to their design and are only subjected to the corresponding transport and holding forces.

At the moment of deflection, however, lateral forces from the film and those from the described unwanted longitudinal stretching are added and these increase according to the deflection angle and the deflection radius used. In addition, from the beginning of deflection to the end of deflection, the forces shift correspondingly from an angle of 90 degrees to the rear. If deflected by 15 degrees, then the angle becomes 75 degrees.

As a result, the sliding and roller elements of each clip are no longer loaded uniformly, but very unevenly, since the clip is subjected to a horizontal tilting effect via the lateral force directed backwards. The forces to be absorbed by these sliding or roller elements are now distributed over the front clips facing away from the film and the rear film-sided elements of each clip and cause additional wear.

Another disadvantage of the clip system is that the clip engages the film at the inlet of the stretching furnace and releases it again at the outlet. The clipping occurs in such a way that the clip closes more with thinner film and less with thicker film. FIGS. 3A-3D show the degree of closure during clipping for different film thicknesses, from left to right for increasing film thicknesses. The lateral forces of the film further close the clip.

This means that in the event of excessive lateral forces, e.g. if the temperature profile of the film is not correct, all stretching forces are transmitted via the clips to the sliding and roller elements and from there to the track. The clips can never release the film, they grip the film more and more strongly as the lateral force increases. Such a situation always triggers a rupture either of the film or of the clip and chain track system. It is not possible for the film to be released by the clips. A fracture of the film is not too bad, but if the film is too thick and too cold at the beginning of the stretching zone, it can cause damage to the chain-track system.

However, the limits of the material's load-bearing capacity have been reached with the systems of the state of the art. In other words, with an increasingly higher film output and correspondingly higher speeds, the chain track/clip solution is likely to become increasingly difficult to be implemented both technically and economically.

Therefore, it is an object to provide base structures, devices and methods for transporting and TD-stretching of film, by means of which the described disadvantages can be eliminated at least partially.

SUMMARY

This object is addressed by the base structures, devices and methods described herein.

Accordingly, there is provided a base structure for a device for transporting film, the base structure comprising:
  exactly one upper guide unit and exactly one lower guide unit, wherein
  the upper guide unit is adapted to guide an upper movable rope and the lower guide unit is adapted to guide a lower movable rope, wherein
  the upper rope and the lower rope are arrangeable to clamp and entrain the film at its side edge at least in places, and wherein
  at least one guide unit of the guide units is configured to press the film via the rope guided by the guide unit against the rope guided by the other guide unit,
  wherein each guide unit has exactly one roller element, which is designed to guide the respective rope,
  wherein the base structure has a web portion via which the base structure can be connected to a second base structure of the same type.

Similar means that the further base structure may be exactly the base structure as configured according to this disclosure.

The chain/clip solution known from the prior art for transporting the film is thus replaced by a solution with guided ropes. This leads to a simplification of the structure. At the same time, higher transport speeds are possible because ropes can be driven, moved and deflected very easily. The ratio of the moving masses of the film and the ropes improves enormously compared to the very heavy chain track systems.

The web portion may impart a rotatable connection to the second base structure. Here, rotatable means that one base structure is rotatable about a vertical axis relative to the other base structure. The connection may also be fixed, meaning non-rotatable.

The base structure may have a holding section which serves for holding the two guide units and on which the web portion is arranged and to which the web section of a third base structure similar to it may be connected.

The holding section can provide a rotatable connection to the third base structure. Again, rotatable means rotatable about a vertical axis. A fixed connection to the third base structure may also be implemented.

Damping means may be provided, arranged between the base structure and the second base structure, for damping vibration effects of the base structure and/or the ropes.

A pressure member may be provided, in particular, a pneumatic pressure member, which is provided to press one roller element against the other roller element.

The clamping of the film is effected by the roller elements (20, 30) and by their pressure on the ropes.

The film may be clamped between the upper rope on the upper film surface and the lower rope on the lower film surface.

At least one rope may be an endless rope, in particular, a rope made from steel.

At least one rope may be made from plastic or have a portion made from plastic, in particular, a sheath and/or core made from plastic. The overall design and arrangement of the ropes is thus intended to optimize the clamping of the film.

At least one rope may have (e.g., in its core) devices for measuring process data such as temperatures and/or data lines and for transmitting the process data or data derived therefrom to outside the rope.

With only one type of base structure, rows of base structures may be formed, which then result in a device for transporting film.

Accordingly, the invention may also comprise a device for transporting film in a transport direction, MD, in particular, for a stretching plant, having:

two rows of base structures according to the above-specified invention, one row being arranged on the right in the transport direction and the other row being arranged on the left in the transport direction, wherein the at least two rows of base structures are adapted to guide the ropes respectively guidable by them at the same speed.

The right-hand row and the left-hand row may each comprise a first number of fixedly interconnected base structures and a second number of rotatably interconnected base structures.

The first number of base structures may form a first area I and a third area III and the second number of base structures may form a second area II, wherein the second area II is arranged in the transport direction between the first area I and the third area III and wherein the first area I is arranged parallel to the transport direction MD and the third area III is arranged at a predetermined stretching angle to the transport direction and all base structures of the second area II are rotated by an equal angle with respect to a base structure adjacent thereto in the transport direction, the sum of the angles giving the stretching angle.

The device may further comprise: first film heating means arranged in the first area I in the transport direction between individual base structures and directed towards the film.

The device may further comprise: temperature insulating enclosures in the second area for the base structures and second film heating means in the second area, which are arranged outside the enclosures and are directed towards the film.

The device may further comprise: an inlet portion at which the at least one upper rope and the at least one lower rope form an angle that is opened in a vertical plane against the transport direction, such that the film is insertable between the ropes.

The device may further comprise: a stretching portion in which the left ropes and the right ropes are guided to diverge from each other at an angle opened in the transport direction, such that the film is stretchable between the ropes on the left side and on the right side.

The device may further comprise: an outlet portion at which the at least one upper rope and the at least one lower rope form an angle that is open in a vertical plane in the transport direction, such that the film is releasable from clamping between the ropes.

The device may further comprise: a roller member at the outlet portion, the roller member being adjustably arranged to adjust the outlet width of the film.

Each base structure may be configured to fix the ropes transversely to the transport direction and vertically to the transport direction, with respective roller elements being provided to contribute to the fixation.

The device may further comprise: a heating device arranged to heat the ropes.

The device may further comprise: a cooling device arranged for cooling the ropes.

The device may further comprise: means for roughening the edges of the film to enable a better connection between the ropes and the film.

The device may further comprise: a measuring and control device arranged for controlling the temperature of the ropes and/or the guide units.

The invention may also comprise a method for transporting film in a transport direction, MD, in particular for a stretching plant, wherein an upper moving rope and a lower moving rope are guided, wherein each rope is guided respectively by exactly one roller element and the one upper guided rope and the at least one lower guided rope clamp the film at its side edge at least in places between them and carry it along.

The film may be guided and entrained on the left-hand side and on the right-hand side in the transport direction.

Hereby, base structures according to this disclosure may be used.

At least one rope may be an endless rope, in particular, a rope made from steel.

The film may be transported by two rows of base structures according to this disclosure, one row being arranged in the transport direction on the right and the other row being arranged in the transport direction on the left, the ropes guided by each of them being at the same speed.

The row arranged on the right and the row arranged on the left may each comprise a first number of base structures fixedly connected to each other, and a second number of base structures rotatably connected to each other.

The first number of base structures may form a first area and a third area and the second number of base structures may form a second area, wherein the second area is arranged between the first area and the third area in the transport direction, and wherein the first area is arranged parallel to the transport direction and the third area is arranged at a predetermined stretch angle to the transport direction, and all base structures of the second area are rotated by an equal angle with respect to a base structure adjacent thereto in the transport direction, the sum of the angles giving the stretch angle.

The film may be heated in the first area in the transport direction between individual base structures.

The base structures in the second area may be temperature-insulated by enclosures and the film may be heated by second film heating devices in the second area, which are arranged outside the enclosures.

The film may be guided in the transport direction on the left side and on the right side.

Each rope may be stretched by at least one roller element and each rope may be driven by at least one roller element.

Temperatures of at least one rope may be measured and regulated.

Parameters (e.g., temperatures) measured in at least one of the ropes may further be transmitted to the outside of the at least one rope.

The method according to the invention may be particularly advantageously carried out with the device according to the invention as defined above.

The invention further comprises the film, in particular, continuous film, produced or producible using the previously described method.

The film may be one of polyolefinic raw materials, polyester, polyamide, PLA, polystyrenes, polycarbonates.

The film may be a semi-crystalline thermoplastic material.

The film usually is continuous.

The use of rope and roller systems instead of clip or chain systems thus enables a higher plant speed and higher throughput rates, thus, a higher output of the plant with a simpler design.

BRIEF DESCRIPTION OF THE DRAWING

The invention and embodiments are described in more detail in the drawing, which shows

DETAILED DESCRIPTION OF THE PREFERRED EMBODIMENTS

Figure 1A:
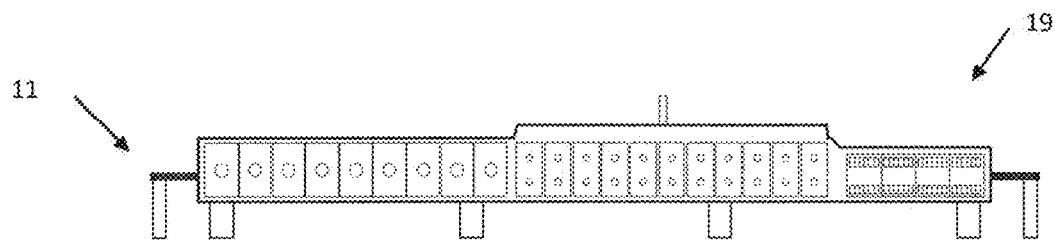
FIGS. 1A and 1B show a prior art film transport device.

Throughout this text, indications of orientation such as "left", "right", "top", "bottom", "side" refer to the transport direction MD or to the film 100, unless otherwise stated. The film is said to be oriented with its surface horizontal. The above information in the text refers to this, unless otherwise stated there.

FIGS. 4 to 12 illustrate basic principles of the invention. The basic structure 1 according to the embodiment of a device for transporting film 100 has (cf. in particular FIG. 4 and FIG. 8): an upper guide unit 60 and a lower guide unit 50, wherein the upper guide unit 60 is configured to guide an upper movable rope 10-3 and the lower guide unit 50 is configured to guide a lower movable rope 10-1, wherein the upper rope 10-3 and the one lower rope 10-1 are arrangeable to clamp and entrain the film 100 at its side edge at least locally therebetween, wherein at least one guide unit 50, 60 of the guide units 50, 60 is configured to press the film 100 via the rope 10-3 guided by the guide unit 50, 60 against the rope 10-1 guided by the other guide unit 50. Furthermore, the base structure 1 comprises a holding portion 13 and a web portion 12. The holding portion 13 carries the two guide units 50, 60, which are each hinged to it via legs 16, and the web portion 12 provides the connection to the adjacent base structure 1, cf. FIG. 10. This connection can allow rotation relative to the adjacent base structure 1, preferably, up to a defined maximum angle (in the horizontal). The base structures of each side are identical to each other.

The lower guide unit 50 may be configured to support the upper guide unit 60.

The film 100 rests on the lower rope 10-1 and is clamped by the lower rope 10-1 and the upper rope 10-3. In this way, the film 100 can be transported with the movable ropes in the transport direction MD.

The upper guide unit 60 is the one whose rope 10-3 touches the upper side of the film 100, and the lower guide unit 50 is the one whose rope 10-1 touches the lower side of the film 100.

The respective upper guide unit 60 or a part thereof is designed to be vertically movable. The bearing of the roller elements of the upper guide unit is thus designed in such a way that the pressure may be measured and adjusted.

Each guide unit 50, 60 comprises a respective roller element 20, 30, which is designed to guide the respective at least one rope 10-1, 10-3. The lower guide unit 50 is designed to be movable, and the upper guide unit 60 is also 50 movably fixed.

Figure 4:
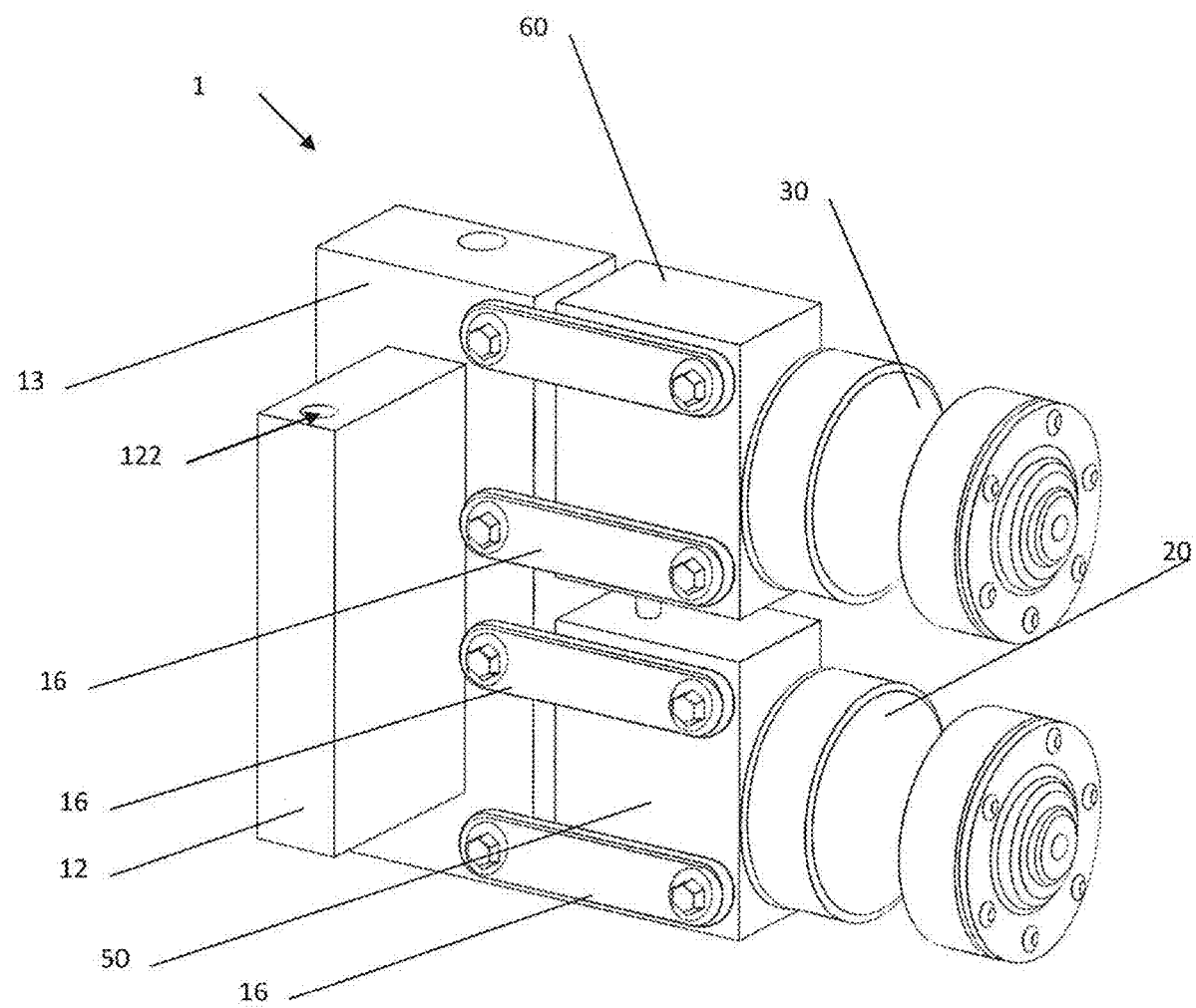
FIG. 4 shows a base structure according to a first embodiment of the invention.

According to FIG. 4, the upper guide unit 60 has exactly one roller element 30, which is arranged above the rope 10-3 guided by the upper guide unit. The lower guide unit 50 has exactly one further roller element 20, which is arranged below the rope 10-1 guided by the lower guide unit.

Pressure may be applied to the respective rope from above and/or below.

A base structure 1 with its guide units 50, 60 is fixedly connected to an adjacent base structure 1 via the holding section 13 or is rotatably connected if a deflection in TD is to be realized.

The upper guide unit 60 is thus horizontally movable with the lower guide unit 50 and also offers the possibility of influencing the pressure on the upper rope 10-3 and thus the clamping force on the film 100. Preferably, the upper guide unit 60 has the same length as the lower guide unit 50. The guide units or their roller elements 20, 30 are arranged vertically one above the other with respect to their roller pivot points. Preferably, the two roller elements have one and the same diameter.

With a plurality of base structures 1 according to this disclosure, one or more areas are realized. The guide units 50, 60 in one area may be different from the guide units 50, 60 in another area. The areas may—but do not have to—correspond to the areas I to IV explained at the beginning.

The clamping force on the film 100 is generated by the pressure of one rope 10-3 against the other rope 10-1. The clamping force on the film 100 is adjusted by means acting on one or both of the guide units 50, 60 or parts thereof (e.g. the roller elements). These means may include, in addition to the gravitational force of the guide units 60 and the upper rope 10-3, devices which exert pressure on the guide units 60 or parts thereof (e.g. the roller elements), which they transmit via the rope 10-3. These devices may act, for example, pneumatically, hydraulically, and/or electrically. In addition, devices may be provided that detect the pressure of the clamping and adjust the pressure on the respective guide units 50, 60 or parts thereof depending on the sensed pressure.

It is also possible to influence the clamping force of the ropes somewhat via the rope tension, especially in the areas where pressure is not applied directly via the rope pulleys.

Here, each rope 10-1, 10-3 is an endless rope, in particular, a rope made from steel. Such an endless rope may be made, for example, by splicing the ends of a rope.

The ropes may also have a core made from plastic or, for example, have a rough surface and/or a plastic sheath around a metal or plastic rope.

Also, the ropes may be pure plastic ropes or made of a mixture of steel and plastic. These ropes may also have a smooth surface or be appropriately covered with a plastic sheath.

At least one rope may have (e.g., in its core) devices for measuring process data such as temperatures and/or data lines and for transmitting the process data or data derived therefrom to outside the rope.

The choice of materials for the ropes may influence the clamping effect as well as the temperature of the ropes. For example, a rope with a plastic content is easier to keep at a low temperature and therefore, can be cooled better because it absorbs less heat. A rope that is at a lower temperature compared to the film may be more effective in terms of adhesion of the relatively warmer film to the rope. Ropes may be cooled very efficiently with air. If at all necessary, this can be done in a simple manner at the return end of the ropes, i.e. where the ropes are not normally guided by the guide units according to the disclosure. This is also an advantage compared with the clip system, where the very strongly heating clips together with the chains can only be cooled with difficulty due to the large moving masses—and in particular at high transport speeds. The chain return may then no longer be sufficient for this purpose.

The guide elements 1 are static, so they may be enclosed, for example, in order to be cooled from the side facing away from the film (i.e. from behind), for example with cold air. The enclosure may be provided separately for individual guide elements or for several guide elements together, e.g. in the heating zone (area I).

In addition, the roller elements 20, 30 may be cooled via their axles.

The condition of the surface of the ropes also plays a role in clamping, stretching and transporting the film. For example, roughening of the surface or a very smooth surface can influence the adhesion of the film, irrespective of the clamping. By means of a directionally anisotropic nature (roughness, smoothness) of the ropes, for example, a certain slippage of the film in one direction (e.g. in MD) may be favored, while slippage in the other direction (e.g. TD) is reduced or prevented altogether. This could be used to compensate for pathway differences of the ropes when staggered at the transition between area I and area II.

To minimize or completely prevent slippage, the rope surfaces may be sheathed, e.g. made from plastic.

Also, the upper rope 10-3 may have a different (in particular opposite) direction of lay than the lower rope 10-1. In addition to the direction of lay, the type of lay may also be considered to be a constant lay or a cross lay. In this case, the strands of the upper rope 10-3 and of the one lower rope 10-1 may come to lie better in each other with an additional effect with regard to slip and clamping of the film 100.

Furthermore, the ropes may have different thicknesses. For example, the lower rope 10-1 may be thicker than the upper rope 10-3. Preferably, however, both ropes are of the same nature.

The guide units 50, 60 or their roller elements 20, 30 may also be offset from each other in TD or in MD for even better clamping of the film. When offset in MD, the axes of rotation of the roller elements 20, 30 are no longer vertically above one another. When offset in MD, the roller elements 20, 30 do not rotate in the same plane.

The running surfaces of the roller elements 20, 30 may grip the ropes to a greater or lesser extent and thus also guide them.

At least two rows of base structures 1 together form a device for transporting film 100 in a transport direction MD, in particular, for a stretching plant, wherein one row of base structures 1 is arranged on the left in the transport direction MD and the other row of base structures 1 is arranged on the right in the transport direction MD, wherein the at least two rows of base structures are designed to guide the ropes that may be guided by them at the same speed.

Figure 1B:
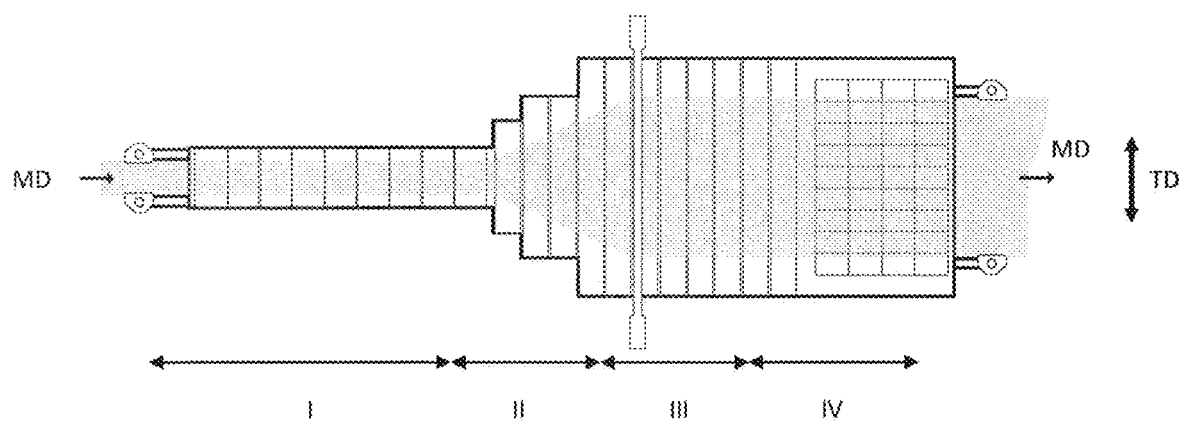
Figure 2:
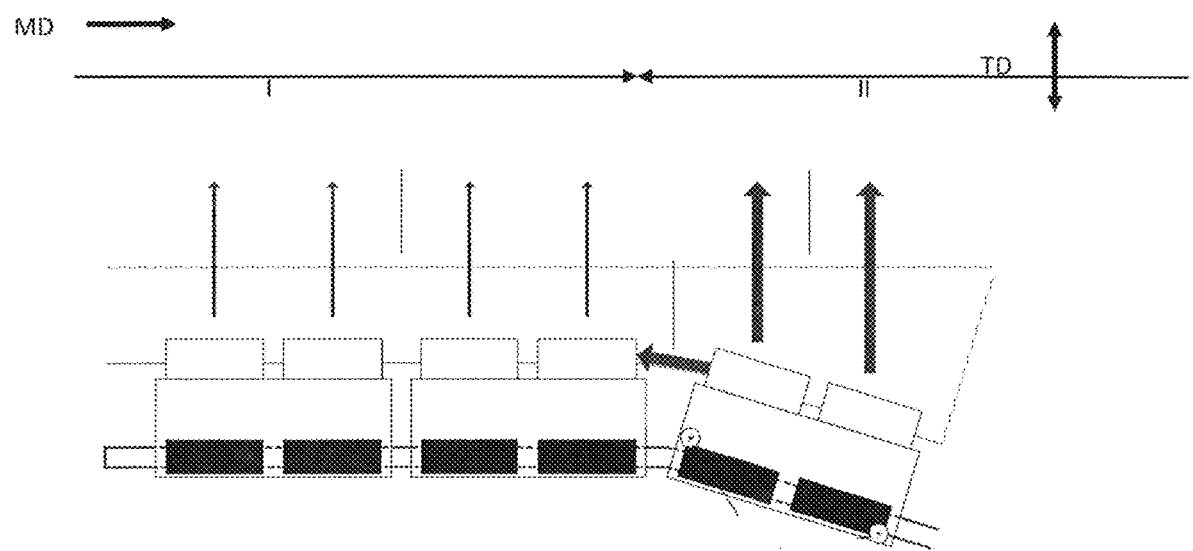
FIG. 2 shows the transition between the heating area and the stretching area in the transport device of FIGS. 1A and 1B.
Figures 3A, 3B, 3C, 3D:
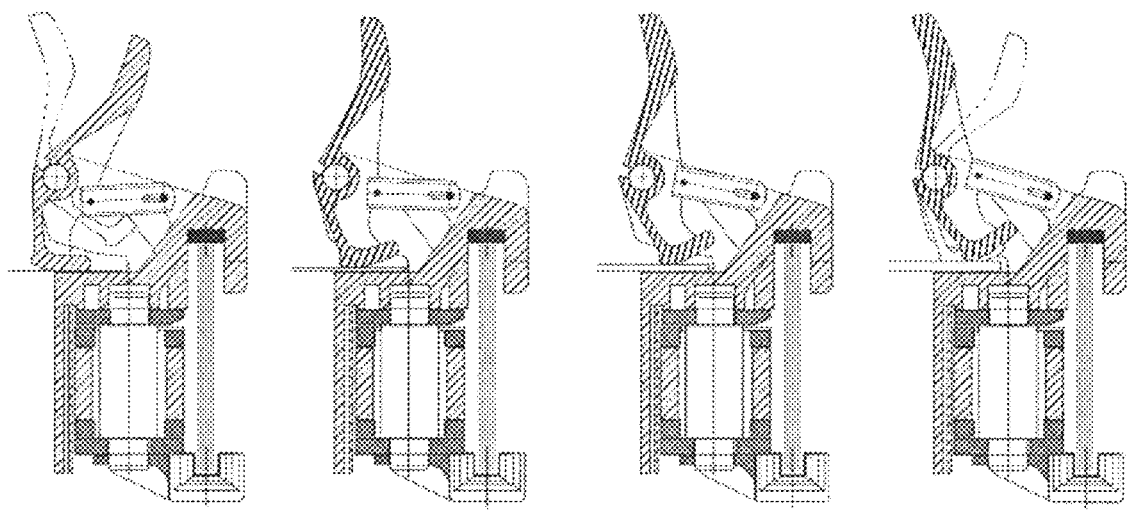
FIGS. 3A-3D show the degree of closure during clamping for different film thicknesses.

Thus, the left row of base structures 1 is arranged to clamp the film 100 at its left edge, and the right row of base structures 1 is arranged to clamp the film 100 at its right edge. In accordance with the different requirements in areas I to IV (cf. FIG. 1B) for guiding the ropes, the rows of base structures there may be designed differently in each case. Different variants are described below.

In the following, different configurations of rows of base structures 1 are further described with reference to FIGS. 5 to 12. The terms base structure 1 and guide element 1 (as distinct from guide unit 50, 60) are used synonymously. The deflection or backward deflection of the ropes (and of the film there over) is also effected by lateral displacement or rotation of a straight running base structure consisting of a number of such guide units at its end, as seen in TD. Here, the guide elements 50, 60 carrying the roller elements 20 and 30, respectively, are mechanically fixed and thus do not allow any opening or closing angle between the adjacent guide units 1.

Figure 5:
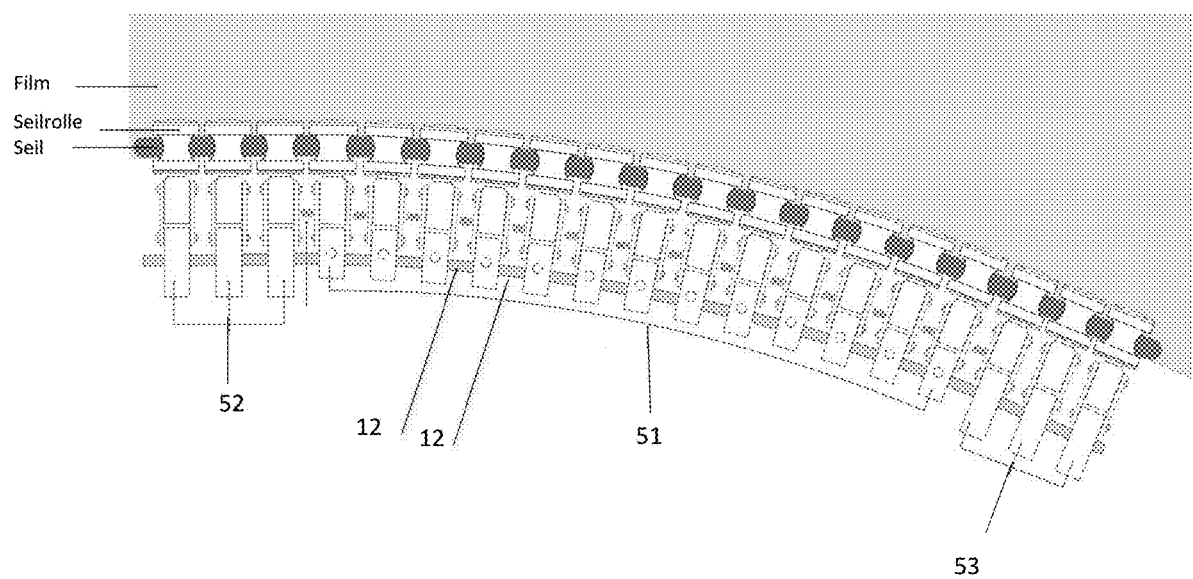
FIG. 5 shows a top view of the right side of a row of base structures according to FIG. 4.

In the area 51 in FIG. 5 of a deliberate or possible deflection or backward deflection, the individual guide elements 1 are connected to each other so that they can rotate relative to each other. The first guide element 1 at the beginning of this zone, in which the individual guide elements 1 are rotatably connected to each other, and the last guide element 1 at the end of this zone are also fixedly connected to the upstream or downstream fixedly connected guide elements 1, cf. 52 and 52 in FIG. 5.

If the angle is now changed via a lateral displacement of the downstream fixed guide elements 1, this is reproduced via the number of rotatably connected guide elements in such a way that it is distributed evenly over the individual rotatable guide elements. Example: A stretching angle of 12 degrees is set by shifting/rotating the fixed guide elements 1. In the case of 10 rotatably connected guide elements, this stretch angle is now distributed evenly over these guide elements with an angle of 1.2 degrees between every two adjacent guide elements. Therefore, the sum of the angles between two guide elements in each case gives the stretching angle.

The number of rotatably connected guide elements 1, the determination of a maximum angle between these guide elements 1 allow a very flexible setting of the stretching angle as well as the radius in which this is implemented.

The number of rotatably connected guide elements 1 also allows very flexible settings by designing the system for a larger number of rotatably connected guide elements 1, e.g. 20 with a deflection range of then approx. 1.2 meters. This would now distribute a stretching angle of 12 degrees over 20 rotatably connected guide elements of 0.6 degrees each and perform the deflection over the full 1.2 meters.

Up to the maximum adjustment angle between the rotatably connected guide elements, 1 more of these rotatably connected guide elements may now be mechanically connected to the fixed guide elements before or after them in order to achieve a smaller deflection radius for the desired 12 degrees. In this case, with a maximum angle of 1.5 degrees in this example, 8 of the 20 guide elements must be rotatably connected to each other between the rotatably connected guide elements, and a correspondingly smaller deflection radius results. However, the maximum angle could in principle be up to 4 degrees.

Figure 6:
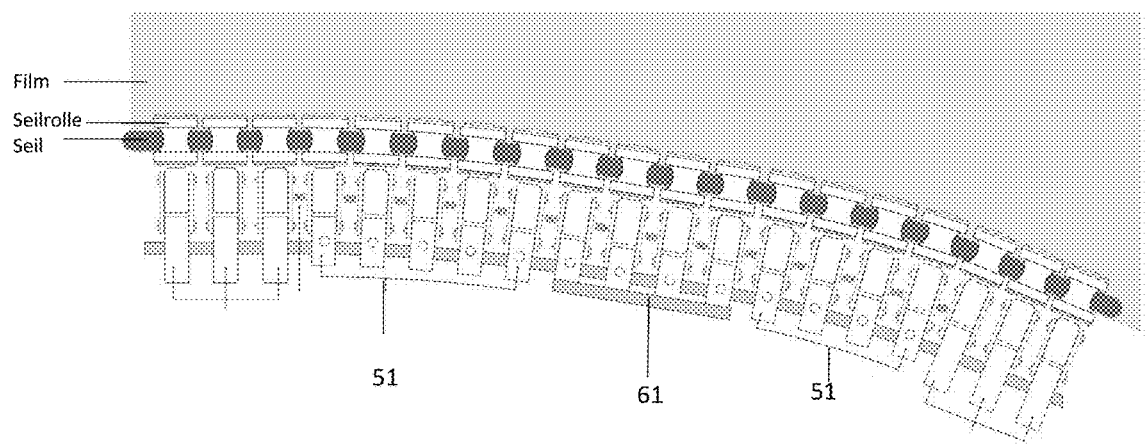
FIG. 6 shows a view from above of the right side of another row of base structures according to FIG. 4.
Figure 7:
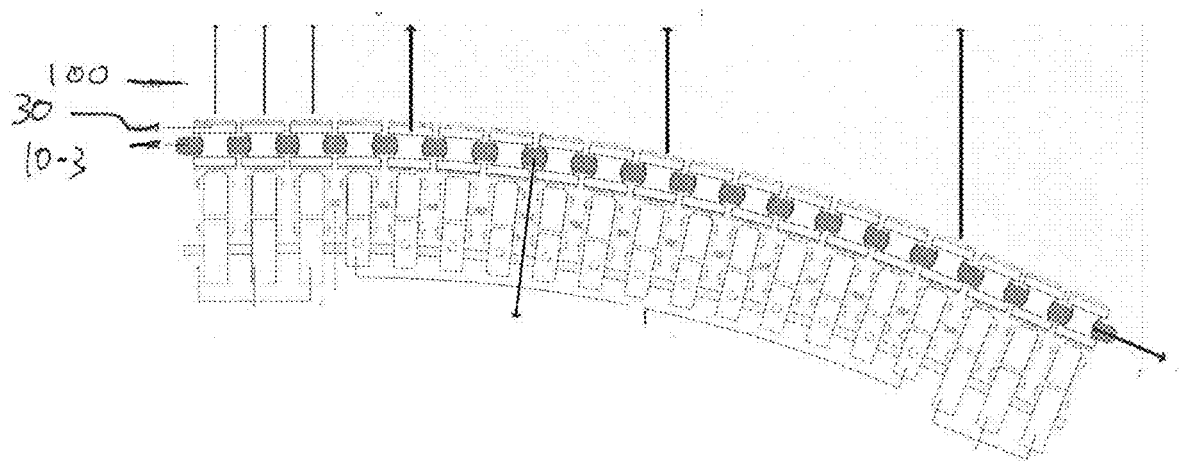
FIG. 7 shows a lateral force distribution of the row according to FIG. 6.
Figure 8:
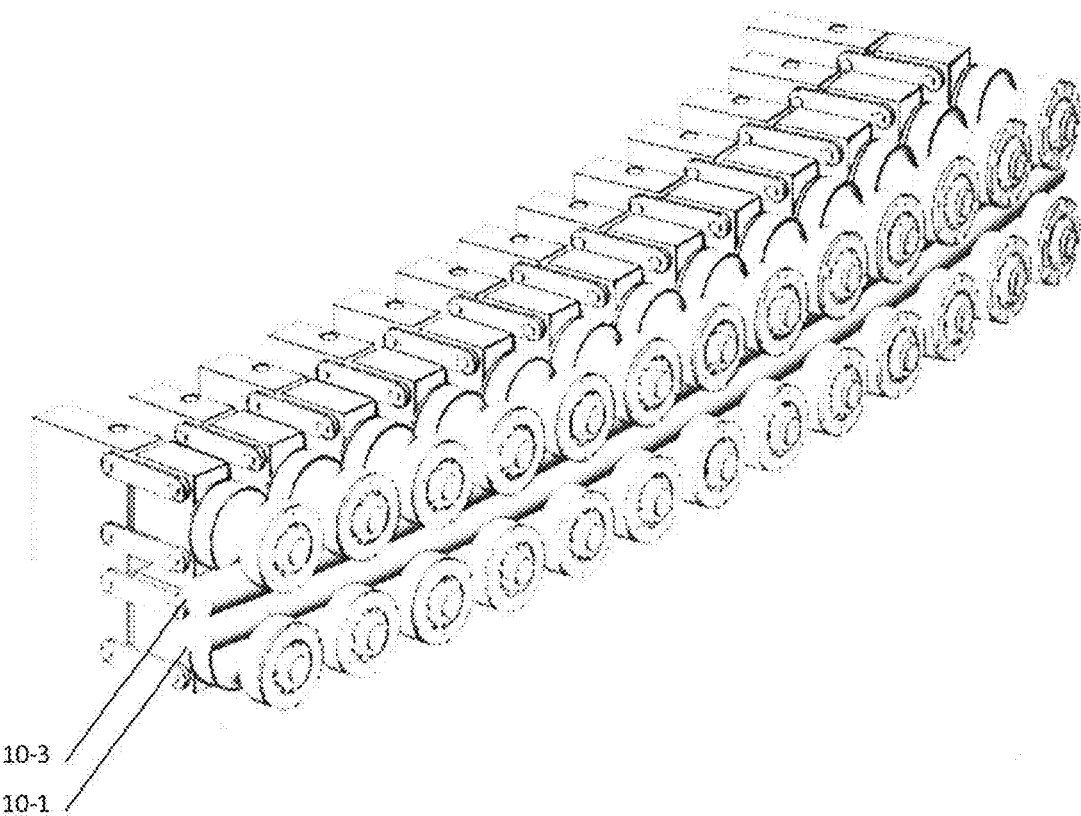
FIGS. 8-10 shows views from different perspectives of a row of base structures according to FIG. 4.
Figure 9:
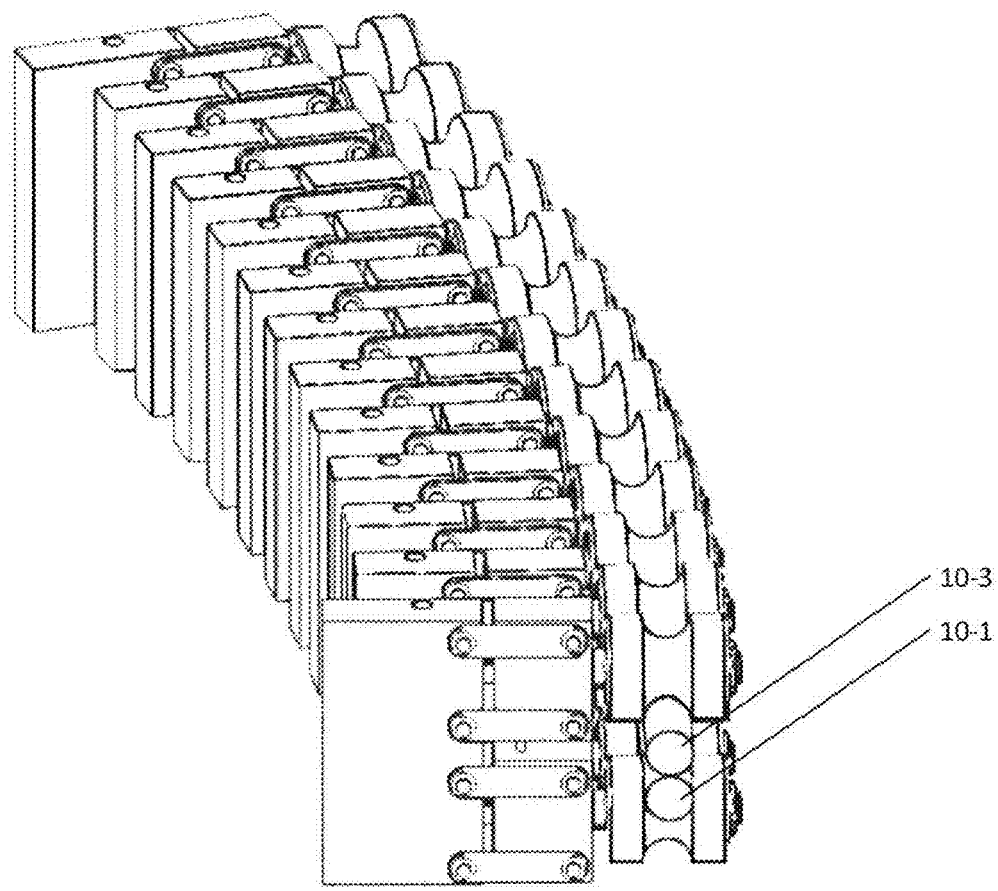
Figure 10:
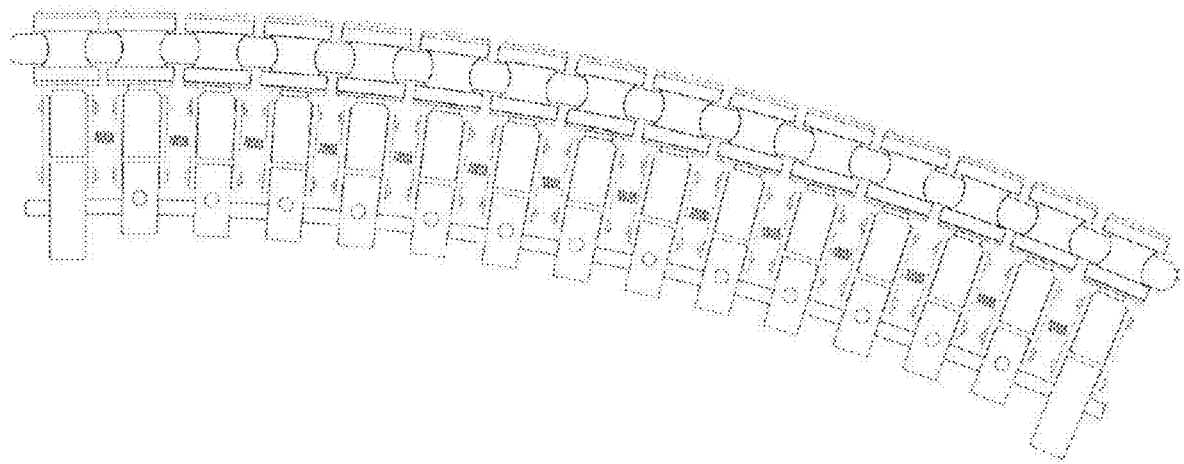

If desired with respect to the process, some guide elements within these e.g. 20 rotatably connected guide elements 51 in FIG. 6 may also be fixedly connected straight, whereby the radius is distributed e.g. over 2 radii, cf. 61 in FIG. 6. A connection representing a fixed negative stretching angle in this zone is also possible.

These fixedly connected guide elements 1 distribute the set extension or retraction angle correspondingly linearly and may rotate freely relative to each other in the fixed frame, if not fixed. In order to avoid vibration effects on the guide elements and/or the cables at high speeds, it is intended to install so-called braking devices (i.e. a damping device) in the form of springs or the like between these guide elements. The stretching angle once set by the lateral displacement may be freely distributed between these rotatably connected guide elements 1, but then remains fixed until another setting of the stretching angle.

Advantages of the embodiments of the invention: The variable adjustment possibility of the stretching angle and the radius in which this is implemented. This is very advantageous in film production, because certain properties of the film can be influenced by the setting of the stretching angle or the stretching angle and the radius. In order to achieve certain properties of the film, it is often necessary to set a high initial angle with a small radius, then ease off a little, i.e. set a negative angle, and then stretch again to achieve the desired stretch ratio.

There is no unwanted longitudinal stretching.

The distribution of the forces in the deflection and stretching phase: Unlike in the case of the clip systems as described above, the lateral forces 72 occurring in the stretching phase and in particular in the deflection phase are distributed much better, see FIG. 7.

Due to the permanent clamping by the ropes, there is no unwanted longitudinal stretching with the corresponding forces acting on the system.

The lateral forces that shift backwards in TD in the course of the deflection according to the deflection angle do not have the same negative effect as on the clips that tilt as a result.

On the contrary, the ropes and the pulleys guiding them are less stressed by the ropes being pulled forward when the direction of the lateral force is shifted backward relative to the running direction.

In addition, the lateral forces acting on the inside of the pulleys on the film side are balanced by those acting on the outside of the pulleys on the film side via the deflection of the ropes.

The rope tension may be used to compensate for and adjust these forces.

Holding and releasing the film: In contrast to clip systems, which always hold the film in place and cannot release it, which as described above can also lead to breakage of the entire chain track system if the stretching forces become too high, the pressure of the upper and lower guide units on the respective ropes may be adjusted variably for each guide unit.

This means that in the zones without lateral forces, the pressure will be just sufficient to hold the film in place, and in the zones with higher lateral forces, which vary according to the thickness of the film, the pressure will be increased accordingly, but only by a certain percentage above the required holding force.

This system may also open all or certain guiding elements on command or automatically by means of set parameters and thus release the film if, for example, a temperature drop occurs in front of the stretching zone which causes the stretching forces to increase.

The low overall height: This system allows a much lower overall height compared to known chain track and clip systems.

This low overall height makes it possible to bring the heating devices (nozzle boxes) and thus the blowing of hot air onto the film much closer to the film.

This makes it possible to reduce the air velocity and thus the amount of hot air needed for heating, or even the temperature of the air. At the same time, it is also possible to reduce the length of the heating zone, in particular, with the corresponding savings in energy and investment costs. Also, when converting existing lines, it is possible to bring them closer to the film by correspondingly converting the nozzle boxes, thus increasing the film output of such lines accordingly.

The individual guide elements 1 are mounted on a track which extends over the respective zone but may also be shorter.

Where the ropes are to be guided straight, the guide elements 1 are connected straight. However, this may be decided freely. If now at the end of such a fixed connecting portion, e.g. after the 4 meters, the angle is adjusted on the next support (e.g. a stretching angle is set to 12 degrees), then this is mapped over the non-fixed guide elements at the beginning of these fixed guide elements. This can be called the "snake effect". A snake, when it creeps around the curve, does not do this from one vertebra to another, it distributes the curvature to a certain number of its vertebrae in the curve, and there, evenly. The ropes and the forces on the bearings allow an angle between the respective guiding elements of up to 4 degrees maximum. This means that if the fixed track is deflected by 12 degrees, then with 10 non-fixed guide elements between these fixed tracks, these 12 degrees would be distributed over 11 interstices, i.e. 1.09 degrees per interstice. The same works for deflecting back at the end of the stretching zone. This saves further guide elements for the respective deflections, which are absorbed by the upper and lower bearings.

The rotatable guide elements, which together form the stretching angle, are freely rotatable and do not have to be fixed to each other in order to realize the stretching angle. It has been found that the constant angular changes of two adjacent guide elements are self-adjusting if only the fixed base structures (or the rails supporting the rows of base structures), between which the rotatable base structures are arranged, are arranged at the desired stretching angle to each other.

A particular disadvantage of clip systems is that there the bearing or sliding shoe layout is dimensioned from the straight run, which means that when the film is running straight, the forces are distributed evenly over the bearings or sliding shoes. However, when the film is deflected, the lateral forces of the stretching and the so-called unwanted longitudinal stretching are added, and these shift backwards in relation to the individual clip according to the set stretching angle from the 90 degree position. This means that the clip receives greater forces on the bearings and sliding elements, and these are no longer optimally distributed. Now, the forces primarily are exerted to the front rear and rear front bearings and sliding elements and lead to wear there.

The rope system has to live with the same forces in the deflection, as far as the lateral forces of the film stretching are concerned, but the forces from an unwanted longitudinal stretching are not added here, since such a stretching does not take place. The forces are distributed to the bearings at the top and bottom and move from the optimum pressure point at the top and bottom in the middle to the walls of the bearings.

But the shifting of the stretching forces to the rear during deflection is positive here, since forces are shifted from the bearings to the pulling rope as a result.

In addition, the forces on the inner wall of the bearings facing the film due to the stretching forces and on the inner wall of the bearings facing away from the film due to the deflection of the rope partially cancel each other out and this may also be influenced/optimized via the rope tension.

The system according to the embodiments of the invention with an overall height of approx. 180 mm has an overall height reduced by approx. 50% compared to known roller chain systems and approx. 40% compared to known sliding chain systems and thus a corresponding improvement in the heat transfer coefficients due to the possibility of bringing the air nozzles closer to the film.

Depending on the requirements, the base structures may be designed to fix the ropes in transverse direction TD to the transport direction MD and in vertical direction. For this purpose, roller elements may be provided, which contribute to the fixing.

For maintenance purposes, the roller elements may be replaced individually from the outside by removing the relevant axles. Easy inspection and exchangeability of the roller elements increase the productivity of the system because the downtimes are reduced.

The guide elements 50, 60 may be designed in such a way that they may be replaced as a whole from each other.

There are numerous other variations on the design of the guide units 50, 60, e.g. to optimize the guidance of the ropes.

The guide units 50, 60 are made from metal, the roller elements 20, 30 likewise. Other materials are also possible if they have sufficient mechanical and thermal stability.

Film threading and deflection: There are the two deflectors at the inlet and at the outlet. If necessary, the inlet may also be used as a brake to increase the rope tension.

For this purpose, the film is allowed to move in between the two deflection wheels of the two ropes.

Advantageously, the main drive of the ropes is arranged in front of or behind the deflection itself. The deflection by means of a deflection roller element provides the necessary rope tension on the forward run, whereas the rope tension on the return run of the ropes is of secondary importance. Additional drives may be added to the main drive, which are located elsewhere on the rope.

The ropes are driven so that they all run at the same speed.

In addition to driving the ropes, a drive may also be provided which acts directly on the film 100.

Advantageously, the film transport device allows the tracks to be moved together along the entire length of the furnace and also at the outlet. This is done by moving all guide rails and the entire deflection at the outlet with all drives.

The degree of stretching of the film 100 in area II may be made variable in a simple manner, in that the rope deflection and the drive wheels are fixed in the outermost position in the outlet. By positioning a small roller element 82 for deflection on a track behind the last opening section, this may be moved along with this track. Only the respective rope length must be compensated for at the return end of the rope, which may be done, for example, by means of further roller elements for deflection.

A similar function, albeit to a much lesser extent, is performed by the roller element 81 at the inlet; it compensates for the slight horizontal displacements of the film usually measured there and reacts together with the purchasing unit and the corresponding measuring device.

The rope return may take place inside the stretching furnace parallel with the inlet or outside the stretching furnace at the same height or via deflection rollers above the stretching furnace or also in the floor in front of it and a straight return track. Additional devices for tensioning, cooling, checking and cleaning the ropes 10-1, 10-3 may be arranged on the return path.

Figure 11:
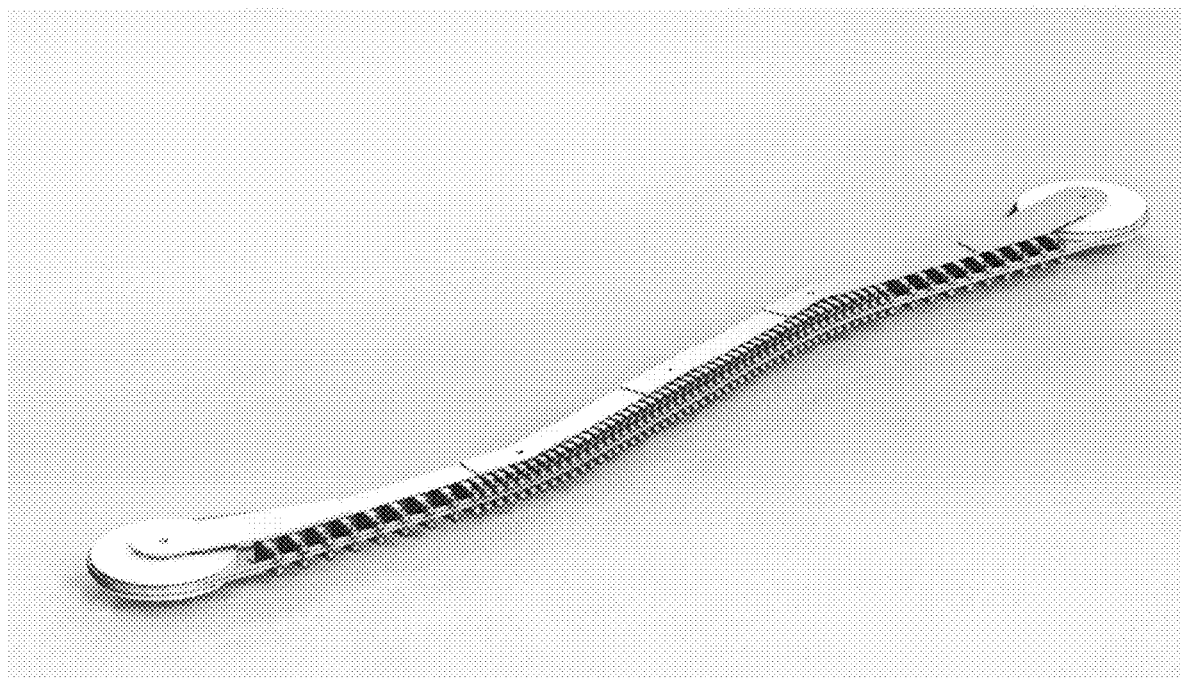
FIG. 11 shows a row of base structures with film inlet and outlet and rope return.
Figure 12:
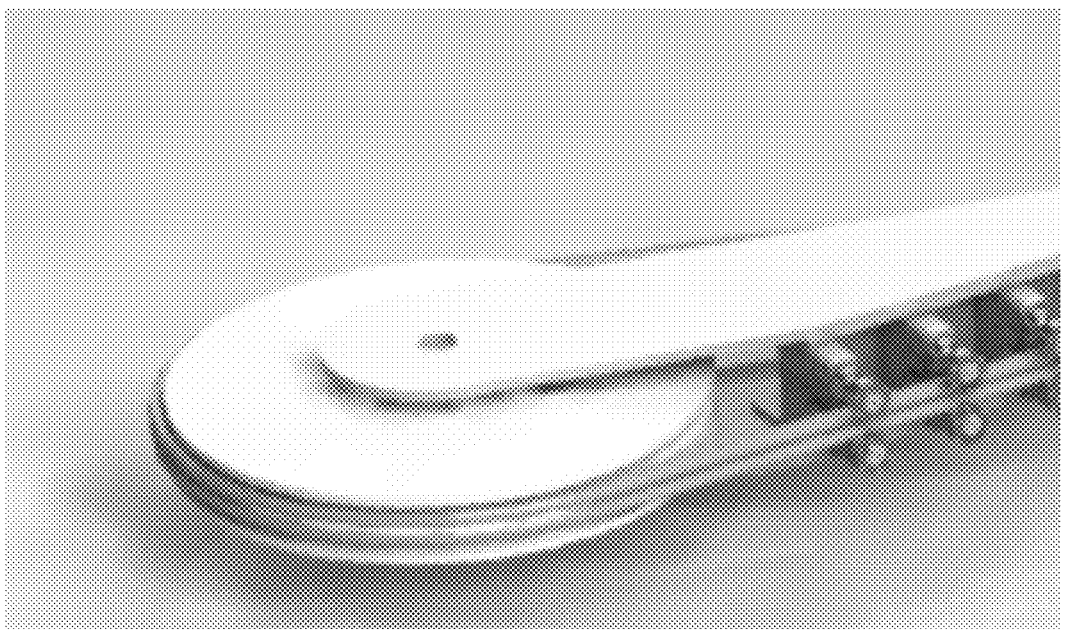
FIG. 12 shows a detailed image of a deflection roller at the inlet or outlet.

FIG. 11 illustrates areas I to IV of the plant, realized with the base structures according to embodiments of the invention. The larger distances between the base structures in the straight areas I and IV and the smaller distances in the stretching area II and in area III are clearly visible. FIG. 12 illustrates the inlet/outlet at the ends of the system.

The entire arrangement of the rope cycle may be effected via horizontally but also vertically arranged drive and deflection wheels.

What is claimed is:

1. A base structure for a device for a transporting film, the base structure comprising:
   exactly one upper guide unit and exactly one lower guide unit, wherein
   the upper guide unit is adapted to guide an upper movable rope and the lower guide unit is adapted to guide a lower movable rope, wherein
   the upper moveable rope and the lower moveable rope are arrangeable to clamp and entrain the film at its side edge at least in places, and wherein
   at least one of the upper guide unit and the lower guide unit is adapted to press the film via the at least one of the upper moveable rope and the lower moveable rope guided by the one of the at least one the upper guide unit and the lower guide unit against the at least one of the upper moveable rope and the lower moveable rope guided by the other one of the at least one the upper guide unit and the lower guide unit, wherein each at least one of the upper guide unit and the lower guide unit has exactly one roller element, which is adapted to guide the respective at least one of the upper moveable rope and the lower moveable rope,
   wherein the exactly one roller element is arranged at the lower guide unit so as to clamp the at least one lower movable rope directly in between it and the at least one upper movable rope, and
   wherein the base structure has a web portion via which the base structure can be connected to a second base structure.

2. The base structure of claim 1, wherein said web portion provides a rotatable connection to said second base structure.

3. The base structure of claim 1, wherein said web portion provides a fixed connection to said second base structure.

4. The base structure of claim 1, further comprising a holding portion which serves for holding the upper guide unit and the lower guide unit and on which the web portion is arranged and to which the web portion of a third base structure similar thereto is connectable.

5. The base structure of claim 4, wherein the holding section provides a rotatable connection to the third base structure.

6. The base structure of claim 4, wherein the holding section provides a fixed connection to the third base structure.

7. The base structure of claim 1 further comprising damping means arranged between said base structure and said second base structure for damping vibration effects of said base structure and/or said at least one of the upper moveable rope and the lower moveable rope.

8. The base structure of claim 1 further comprising a pressure element, which is provided to press one pulley element against another pulley element.

9. The base structure of claim 8, wherein the clamping of the film is effected by the roller elements and their pressure on the at least one of the upper moveable rope and the lower moveable rope.

10. The base structure of claim 1, wherein the film is clampable between the upper moveable rope on the upper film surface and the lower moveable rope on the lower film surface.

11. The base structure of claim 1, wherein the upper moveable rope and the lower moveable rope are endless ropes.

12. The base structure of claim 1, wherein the upper moveable rope has a different direction of lay than the lower moveable rope.

13. A device for transporting film in a transport direction, comprising:
at least two rows of base structures according to claim 1, a row being arranged on the right side in the transport direction and another row being arranged on the left side in the transport direction, the at least two rows of base structures being adapted to guide the at least one of the upper moveable rope and the lower moveable rope which respectively are guided by the at least two rows of base structures at the same speed.

14. The device of claim 13, wherein the row on the right side and the row on the left side each comprise a first number of fixedly interconnected base structures and comprise a second number of rotatably interconnected base structures.

15. The device of claim 14, wherein the first number form a first area and a third area, and the second number form a second area, wherein the second area is arranged in the transport direction between the first area and the third area, and wherein the first area is arranged parallel to the transport direction and the third region is arranged at a predetermined stretch angle to the transport direction and each of the rotatably interconnected base structures of the second area are rotated by an equal angle with respect to a base structure adjacent thereto in the transport direction, the sum of the angles resulting in the stretch angle.

16. The device of claim 15 further comprising a first film heating means arranged in the first area in the transport direction between individual fixedly interconnected base structures and directed towards the film.

17. The device of claim 16 further comprising temperature-insulating enclosures in the second area and a second film heating devices in the second area, which are arranged outside the enclosures and are directed towards the film.

18. A method for transporting film in a transport direction wherein the upper moveable rope and the lower moveable rope are guided,
wherein each rope is guided by exactly one roller element each, and the upper moveable rope and the at least one lower moveable rope clamp the film at its side edge at least in places between them and carry it along, and
wherein the base structures according to claim 1 are used.

19. The method of claim 18, wherein the film is transported by two rows of base structures, each base structure comprising:
the upper guide unit and the lower guide unit, wherein
the upper guide unit is adapted to guide an upper movable rope and the lower guide unit is adapted to guide a lower movable rope, wherein
the upper moveable rope and the lower moveable rope are arrangeable to clamp and entrain the film at its side edge at least in places, and wherein
at least one of the upper guide unit and the lower guide unit is adapted to press the film via the at least one of the upper moveable rope and the lower moveable rope guided by the one of the at least one the upper guide unit and the lower guide unit against the at least one of the upper moveable rope and the lower moveable rope guided by the other one of the at least one the upper guide unit and the lower guide unit, wherein each at least one of the upper guide unit and the lower guide unit has exactly one roller element, which is adapted to guide the respective at least one of the upper moveable rope and the lower moveable rope,
wherein the base structure has a web portion via which the base structure can be connected to a second base structure,
and wherein a row of base structures being arranged on the right side in the transport direction and another row of base structures being arranged on the left side in the transport direction, the rows of base structures being adapted to guide the at least one of the upper moveable rope and the lower moveable rope which respectively are guided by the rows of base structures at the same speed.

20. The method of claim 19, wherein the row arranged on the right and the row arranged on the left each comprise a first number of fixedly interconnected base structures and comprise a second number of rotatably interconnected base structures.

* * * * *